United States Patent
Lobo et al.

(10) Patent No.: US 9,857,998 B2
(45) Date of Patent: *Jan. 2, 2018

(54) BACKUP STORAGE OF VITAL DEBUG INFORMATION

(71) Applicant: International Business Machines Corporation, Armonk, NY (US)

(72) Inventors: Vijay F. G. Lobo, Bangalore (IN); Devender Rao Marri, Peerzadiguda (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/920,913

(22) Filed: Oct. 23, 2015

(65) Prior Publication Data
US 2017/0102889 A1    Apr. 13, 2017

Related U.S. Application Data

(63) Continuation of application No. 14/881,305, filed on Oct. 13, 2015, now Pat. No. 9,678,682.

(51) Int. Cl.
*G06F 3/06* (2006.01)
(52) U.S. Cl.
CPC ............ *G06F 3/0619* (2013.01); *G06F 3/065* (2013.01); *G06F 3/0685* (2013.01)
(58) Field of Classification Search
CPC ....... G06F 3/0619; G06F 3/065; G06F 3/0685
(Continued)

(56) References Cited

U.S. PATENT DOCUMENTS 5,450,586 A * 9/1995 Kuzara ............... G06F 11/3466
                                                  714/1
5,619,409 A * 4/1997 Schultz ................. G06F 9/4812
                                                  700/17

(Continued)

OTHER PUBLICATIONS

Unknown, "System Service Processor," From Wikipedia, the free encyclopedia, Last modified on Feb. 26, 2014, at 16:02, Printed on Oct. 12, 2015, 3 pages.

(Continued)

*Primary Examiner* — Stephen Elmore
(74) *Attorney, Agent, or Firm* — Nicholas D. Bowman

(57) ABSTRACT

A system includes non-volatile memory storing firmware and an embedded baseboard management controller (BMC). The BMC includes a BMC volatile memory and a BMC processor coupled to the BMC volatile memory and the non-volatile memory. The BMC processor performs a first method wherein the firmware is obtained from the non-volatile memory, instrumented, and stored on a host computer volatile memory. Also in the first method, separate copies of vital debug information about the instrumented firmware are stored on the BMC volatile memory and the host computer volatile memory. The system further includes a host computer housing the embedded BMC, the host computer volatile memory, and a host computer processor coupled to the host computer volatile memory. The host computer processor performs a second method wherein the instrumented firmware is obtained from the host computer volatile memory and executed.

15 Claims, 4 Drawing Sheets

(58) Field of Classification Search
USPC ............... 711/162, 102, 103, 147, 154, 156; 712/227; 713/1, 2; 714/2, 10, 11; 717/124, 128, 129, 168
See application file for complete search history.

(56) References Cited

U.S. PATENT DOCUMENTS

| | | | | |
|---|---|---|---|---|
| 5,901,225 | A * | 5/1999 | Ireton | G06F 9/328 714/6.32 |
| 7,251,723 | B2 | 7/2007 | Lam | |
| 7,305,668 | B2 | 12/2007 | Kennedy et al. | |
| 7,331,046 | B2 | 2/2008 | Shida et al. | |
| 7,434,100 | B2 | 10/2008 | Hogdal et al. | |
| 7,478,299 | B2 * | 1/2009 | Brandyberry | G06F 11/2242 714/30 |
| 7,484,084 | B1 * | 1/2009 | Ranaweera | G06F 8/67 713/1 |
| 7,552,217 | B2 * | 6/2009 | Mihm | G06F 8/65 709/227 |
| 7,752,428 | B2 * | 7/2010 | Datta | G06F 21/575 713/194 |
| 7,760,769 | B1 | 7/2010 | Lovett et al. | |
| 7,809,836 | B2 * | 10/2010 | Mihm | G06F 8/65 709/227 |
| 7,827,436 | B2 | 11/2010 | Yang | |
| 7,873,498 | B2 | 1/2011 | Chien et al. | |
| 7,941,810 | B2 | 5/2011 | Khanna et al. | |
| 7,990,994 | B1 * | 8/2011 | Yeh | H04L 12/4641 370/431 |
| 8,201,009 | B2 | 6/2012 | Sun et al. | |
| 8,392,904 | B2 | 3/2013 | Garcia et al. | |
| 8,417,774 | B2 | 4/2013 | Flynn et al. | |
| 8,463,820 | B2 * | 6/2013 | Chhugani | G06F 7/36 707/797 |
| 8,499,295 | B2 * | 7/2013 | Selvam | G06F 8/66 717/168 |
| 8,601,460 | B2 | 12/2013 | Karstens | |
| 8,640,118 | B2 | 1/2014 | Grice et al. | |
| 8,706,955 | B2 | 4/2014 | Fai et al. | |
| 8,805,983 | B2 * | 8/2014 | Dube | G06F 15/16 370/463 |
| 8,977,906 | B2 | 3/2015 | McNeeney | |
| 9,021,317 | B2 | 4/2015 | Bennah et al. | |
| 9,208,047 | B2 * | 12/2015 | Mcgraw | G06F 11/3006 |
| 2003/0084229 | A1 * | 5/2003 | Ho | G06F 8/66 711/102 |
| 2005/0228888 | A1 * | 10/2005 | Mihm | G06F 8/65 709/227 |
| 2005/0229173 | A1 * | 10/2005 | Mihm | G06F 8/65 717/171 |
| 2006/0080636 | A1 * | 4/2006 | Hsieh | G06F 8/51 717/101 |
| 2006/0277371 | A1 * | 12/2006 | Cohn | G06F 9/4812 711/147 |
| 2007/0220364 | A1 * | 9/2007 | Li | G06F 11/0706 714/45 |
| 2008/0126852 | A1 | 5/2008 | Brandyberry et al. | |
| 2008/0313312 | A1 | 12/2008 | Flynn et al. | |
| 2011/0161736 | A1 | 6/2011 | Orita et al. | |
| 2012/0072897 | A1 * | 3/2012 | Selvam | G06F 8/66 717/171 |
| 2013/0212425 | A1 | 8/2013 | Blaine et al. | |
| 2014/0289570 | A1 | 9/2014 | Lewis et al. | |
| 2014/0304695 | A1 | 10/2014 | Gambardella et al. | |
| 2014/0372560 | A1 * | 12/2014 | Spottswood | H04L 67/34 709/217 |
| 2015/0095644 | A1 * | 4/2015 | Gupta | H04L 9/0825 713/168 |
| 2015/0106660 | A1 * | 4/2015 | Chumbalkar | G06F 11/0727 714/42 |
| 2015/0127983 | A1 * | 5/2015 | Trobough | G06F 11/267 714/30 |
| 2015/0169310 | A1 | 6/2015 | Lee-Baron et al. | |
| 2015/0169330 | A1 | 6/2015 | Maity et al. | |
| 2015/0331694 | A1 | 11/2015 | Balakrishnan et al. | |
| 2016/0011894 | A1 * | 1/2016 | Reddy | H04L 67/38 718/1 |
| 2016/0011900 | A1 * | 1/2016 | Reddy | H04L 67/38 718/1 |
| 2016/0013992 | A1 * | 1/2016 | Reddy | H04L 67/38 709/224 |
| 2016/0014039 | A1 * | 1/2016 | Reddy | H04L 67/38 709/224 |
| 2016/0014073 | A1 * | 1/2016 | Reddy | H04L 67/38 713/2 |
| 2016/0048184 | A1 * | 2/2016 | Basile | G06F 1/26 713/310 |
| 2016/0085451 | A1 | 3/2016 | Lee-Baron et al. | |
| 2016/0119180 | A1 * | 4/2016 | Tsai | H04L 41/069 370/241 |
| 2016/0261455 | A1 | 9/2016 | Su et al. | |
| 2016/0364297 | A1 * | 12/2016 | Lo | G06F 11/1417 |
| 2017/0024303 | A1 * | 1/2017 | Christopher | G06F 17/30194 |

OTHER PUBLICATIONS

Unknown, "Gigabyte—Quality Components Make Quality Motherboards," 8 pages, All intellectual property rights, including without limitation to copyright and trademark of this work and its derivative works are the property of, or are licensed to Gigabyte Technology Co., Ltd. http://www.gigabyte.com/microsite/55/tech_081226_dualbios.htm.

Lobo et al., "Backup Storage of Vital Debug Information," U.S. Appl. No. 14/881,305, filed Oct. 13, 2015.

* cited by examiner

BACKUP STORAGE OF VITAL DEBUG INFORMATION

BACKGROUND

The present disclosure relates generally to the field of baseboard management controllers (BMCs), and, more particularly, to debugging host computer firmware.

BMCs (e.g., service processors) are often embedded in servers. A BMC may refer to a computing unit, including a processor and a memory, that operates largely independently from the host computer (e.g., server) in which it is embedded. BMCs are generally used by remote system administrators to monitor the status of servers.

SUMMARY

Embodiments of the present disclosure include a system. The system includes non-volatile memory having host computer firmware stored thereon. The system further includes an embedded baseboard management controller (BMC). The BMC includes a BMC volatile memory and a BMC processor communicatively coupled to the BMC volatile memory and the non-volatile memory. The BMC processor is configured to perform a first method. As part of the first method, the host computer firmware is obtained from the non-volatile memory, instrumented, and then stored on a host computer volatile memory. As further part of the first method, a first copy of vital debug information associated with the instrumented host computer firmware is stored on the BMC volatile memory and a second copy of the vital debug information is stored on the host computer volatile memory. The system further includes a host computer housing the embedded BMC. The host computer includes the host computer volatile memory and a host computer processor communicatively coupled to the host computer volatile memory. The host computer processor is configured to perform a second method. As part of the second method, the instrumented host computer firmware is obtained from the host computer volatile memory and executed.

Embodiments of the present disclosure include a method for using a host computer housing an embedded baseboard management controller (BMC). The BMC includes non-volatile memory having host computer firmware stored thereon, BMC volatile memory, and a BMC processor communicatively coupled to the BMC volatile memory and the non-volatile memory. The host computer includes a host computer volatile memory and a host computer processor communicatively coupled to the host computer volatile memory. As part of the method, the host computer firmware is obtained from the non-volatile memory, instrumented, and stored on the host computer volatile memory. As further part of the method, a first copy of vital debug information associated with the instrumented host computer firmware is stored on the BMC volatile memory and a second copy of the vital debug information is stored on the host computer volatile memory. As further part of the method, the instrumented host computer firmware is obtained from the host computer volatile memory and executed.

Embodiments of the present disclosure include a computer program product for using a host computer housing an embedded baseboard management controller (BMC). The BMC includes non-volatile memory having host computer firmware stored thereon, BMC volatile memory, and a BMC processor communicatively coupled to the BMC volatile memory and the non-volatile memory. The host computer includes a host computer volatile memory and a host computer processor communicatively coupled to the host computer volatile memory. The computer program product includes a computer readable storage medium having instructions stored thereon. The instructions are configured to cause a method when executed by one or more processors. As part of the method, the host computer firmware is obtained from the non-volatile memory, instrumented, and stored on the host computer volatile memory. As further part of the method, a first copy of vital debug information associated with the instrumented host computer firmware is stored on the BMC volatile memory and a second copy of the vital debug information is stored on the host computer volatile memory. As further part of the method, the instrumented host computer firmware is obtained from the host computer volatile memory and executed.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
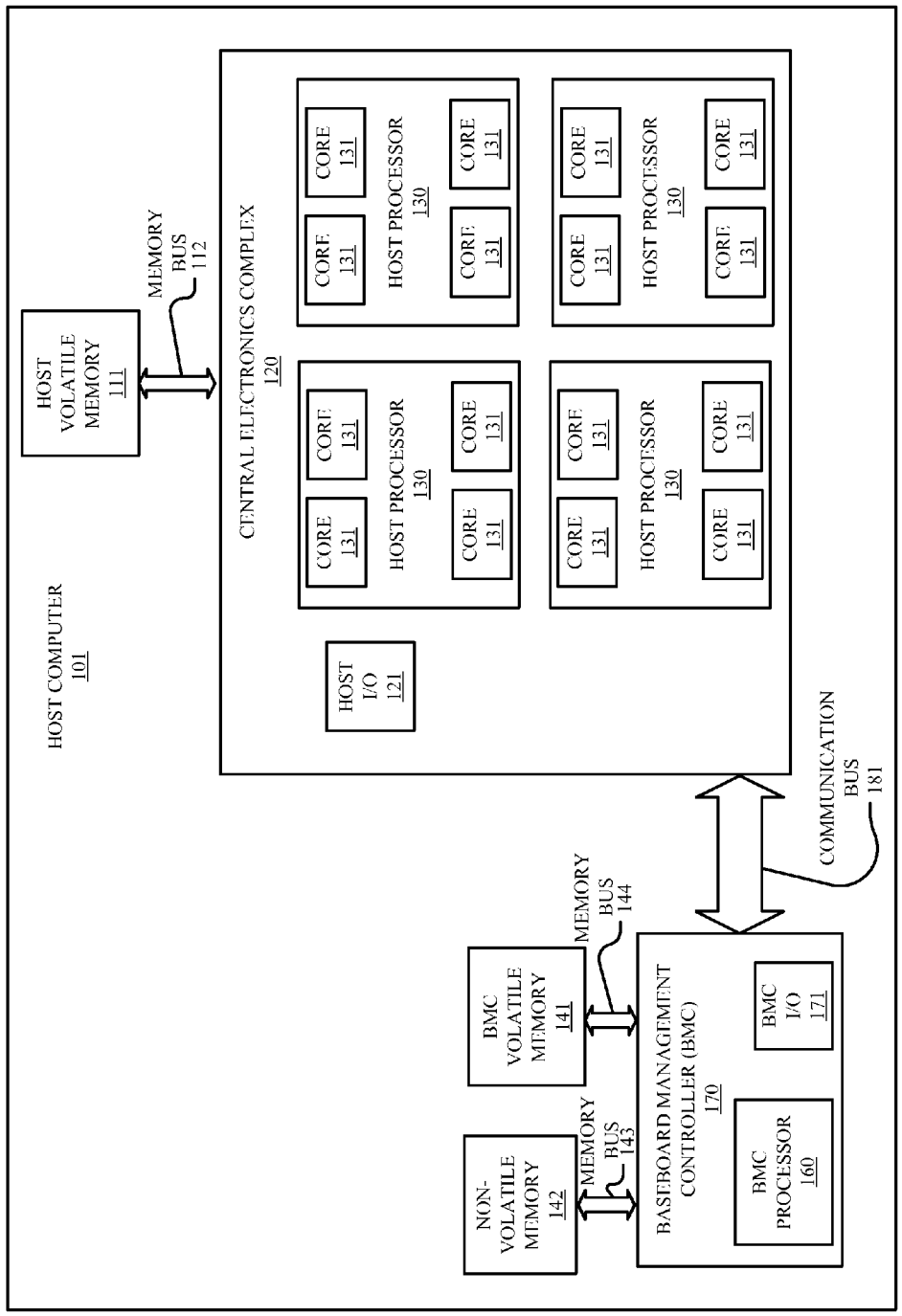
FIG. 1 illustrates a block diagram of an example host computer in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of baseboard management controllers (BMCs), and, more particularly, to debugging host computer firmware. While the present disclosure is not necessarily limited to such applications, various aspects of the disclosure may be appreciated through a discussion of various examples using this context.

In some embodiments, an individual (e.g., developer, system administrator) may be able to debug firmware running on a host computer using the host computer's BMC. This may be made possible by the fact that the BMC has the framework and access rights to communicate efficiently with various components of the host computer in which the BMC is embedded. In some embodiments, the BMC may be effectively used as debugger for debugging the host computer firmware (e.g., hypervisor operation code).

Turning now to the figures, FIG. 1 illustrates a block diagram of an example host computer 101 in which illustrative embodiments of the present disclosure may be implemented. In some embodiments, the host computer 101 may be incorporated into a network (e.g., within a cloud computing environment). Furthermore, in some embodiments, the host computer 101 may include a hypervisor (not shown) designed to host multiple virtual machines across the network.

As shown, the host computer 101 may include a baseboard management controller (BMC) 170 embedded therein and coupled to a central electronics complex 120 by a communication bus 181. In some embodiments, the BMC 170 may run on BMC firmware (e.g., flexible service processor) that allows the BMC to be used for host computer 101 diagnostics, configuration, initialization, and error correction and detection.

In some embodiments, the BMC 170 may include a BMC processor 160 and BMC input/output (I/O) 171 (e.g., device interface). In some embodiments, the BMC I/O 171 may couple the BMC 170 to one or more remote terminals (not shown) via an independent communication channel (e.g., via TCP/IP session over a fiber optic cable) linking the BMC into the network. The BMC I/O 171 may serve to allow the BMC to communicate directly with the remote terminals without communicating through the general host I/O 121. Also as shown, the BMC 170 may be coupled to non-volatile memory 142 (e.g., ROM, EPROM, flash memory) and BMC volatile memory 141 (e.g., DRAM) via memory buses 143 and 144, respectively. The non-volatile memory 142 may store the host computer firmware.

The central electronics complex 120 of the host computer 101 may include one or more host processors 130, with each host processor 130 including one or more processor cores 131. In some embodiments, the central electronics complex 120 may house the processors and memory responsible for performing the major operations of the host computer 101, such as virtual machine hosting. In the depicted example, within the central electronics complex 120 there are four host processors 130 with each host processor having four processor cores 131. These are shown for illustrative purposes only and are not meant to be limiting.

The central electronics complex 120 may further include a host I/O 121. In some embodiments, the central electronics complex 120 may be coupled by a memory bus 112 to a host volatile memory 111. In some embodiments, the host volatile memory 111 may be substantially larger than BMC volatile memory 141 and these two memories may be entirely independent of each other. As used herein, in some embodiments, volatile memory may refer only to non-cache volatile memory.

It is noted that FIG. 1 is intended to depict the representative major components of an exemplary host computer 101. In some embodiments, however, individual components may have greater or lesser complexity than as represented in FIG. 1, components other than or in addition to those shown in FIG. 1 may be present, and the number, type, and configuration of such components may vary.

In some embodiments, the BMC 170 may have a significant role in the booting up of the host computer 101 in which it is embedded. Specifically, upon startup, the BMC 170 may be responsible for reading the boot firmware (e.g., BIOS) compressed image from the host computer's non-volatile memory 142, uncompressing the image, and loading the firmware into the host computer volatile memory 111 so that the firmware can then be accessed by the main host processors 130 of the host computer's central electronics complex 120.

Furthermore, in some embodiments, another, related role of the BMC 170 is to aid a system administrator in the diagnosis of potential problems of the host computer 101. Specifically, this may include debugging the firmware of the host computer 101. As used herein, host computer firmware may, in some embodiments, refer specifically to the central electronics complex firmware (rather than the flexible service processor). In some situations, the debugging of the host computer firmware may involve the BMC 170 obtaining the firmware from the non-volatile memory 142 and then instrumenting the firmware with breakpoint instructions. The instrumented firmware may then be provided (e.g., via placement in the host volatile memory 111) to the host processors 130 for execution and a copy of vital debug information (e.g., segments of the firmware replaced with breakpoints by the BMC 170) may be stored in the BMC volatile memory 141 for use during the debugging process.

In some embodiments, shared memory within the system may play a role in inter-process communication. This may occur, for example, when a process (e.g., running on BMC processor 160) creates an area within the BMC volatile memory 141 which other processes may access. More specifically, the primary process may obtain, from the kernel (not shown), exclusive rights to a set of address spaces within the BMC volatile memory 141 and may share a key with the other processes so that these other processes may also access this area. In some embodiments, a new shared memory may be created within the BMC volatile memory 141 each time a remote client connects to the BMC 170 to begin a new debugging session (e.g., debugging operation). This shared memory may be used for storing vital debug information created and updated during the debug session. By storing this information in shared memory, multiple processors or even multiple remote users may be able to access the vital debug information. In addition, if a remote user's client session is lost, the user may be able to simply reconnect to the lost session and regain access to the shared memory without the loss of shared memory data.

In some embodiments, each time a remote user sets a new breakpoint in the instrumented firmware stored in the host volatile memory 111, the vital debug information may be updated accordingly in the shared memory (e.g., by appending the new breakpoint to an existing breakpoint list). The vital debug information may be maintained until the shared memory is deleted or until the BMC 170 is rebooted (e.g., power-cycled).

The above-described storing of a single copy of the vital debug information in the BMC volatile memory 141 may lead to problems in certain situations. For example, if that copy of the vital debug information is corrupted or deleted during a debugging session (e.g., because of a crash and reboot of the BMC 170), then the whole debugging process may need to be restarted (e.g., by reobtaining the non-instrumented firmware from the non-volatile memory 142, reinstrumenting the firmware, and reloading the instrumented firmware into the host processors 130). This need to restart the debugging process after the vital debug information is lost may be especially apparent in situations where critical sections of the firmware were replaced by breakpoints during an instrumenting process. In such situations, there may be no practical way for the system to know how to use the instrumented firmware without having access to the deleted vital debug information. Ultimately, this loss of vital debug information may create a waste of time and resources.

In some embodiments, a second copy of the vital debug information may be stored in the host volatile memory 111. This may serve as a backup copy such that if the original copy of the vital debug information stored in the BMC volatile memory 141 is deleted during an ongoing debug operation, the backup copy of the vital debug information may be obtained from the host volatile memory 111 (e.g., by generating a new copy of the vital debug information in a new shared memory within the BMC volatile memory 141) and the BMC 170 may be able to continue the debugging operation where the operation was left off before the deletion, without restarting the operation entirely.

Furthermore, in some embodiments, during a session for debugging host computer firmware, vital debug information that is created may include a data structure that contains both firmware segments replaced during instrumenting and/or other vital data about the instrumented firmware (e.g., instrumented operation code) that may be necessary for continuing the debugging session. In some embodiments, the vital debug information may not refer to the instrumented host computer firmware itself. This data structure including the vital debug information may be stored in both the BMC volatile memory 141 and the host computer volatile memory 111 (e.g., the central electronics complex volatile memory) as two separate, substantially identical copies. During the debugging session, the BMC 170 (rather than the central electronics complex 120) may be used for instrumenting the firmware and recording values when breakpoints are hit during execution of the instrumented firmware by the central electronics complex 120. This may make the debugging process more efficient.

If, however, the BMC 170 crashes, then it may need to restart itself and it may lose the copy of the data structure stored in the BMC volatile memory 141. To continue the debugging session after such a restart of the BMC 170, the BMC 170 may be able to generate a new copy of the data structure from the copy stored in the host computer volatile memory 111 and then continue the debugging session where the BMC 170 left off before the restart. This may be possible, for example, in situations where the crash and restart of the BMC 170 do not affect the central electronics complex 120 or the host volatile memory 111. This may have time saving advantages as compared to situations where only a single copy of the data structure is maintained by the BMC 170. More specifically, if there is only one copy of the data structure and that copy is lost in a restart, then a complete power cycle of the host computer 101 may need to be done in order to obtain a new copy of the host computer firmware from the non-volatile memory 142 and the entire debug session may need to be started again from the beginning.

Figure 2:
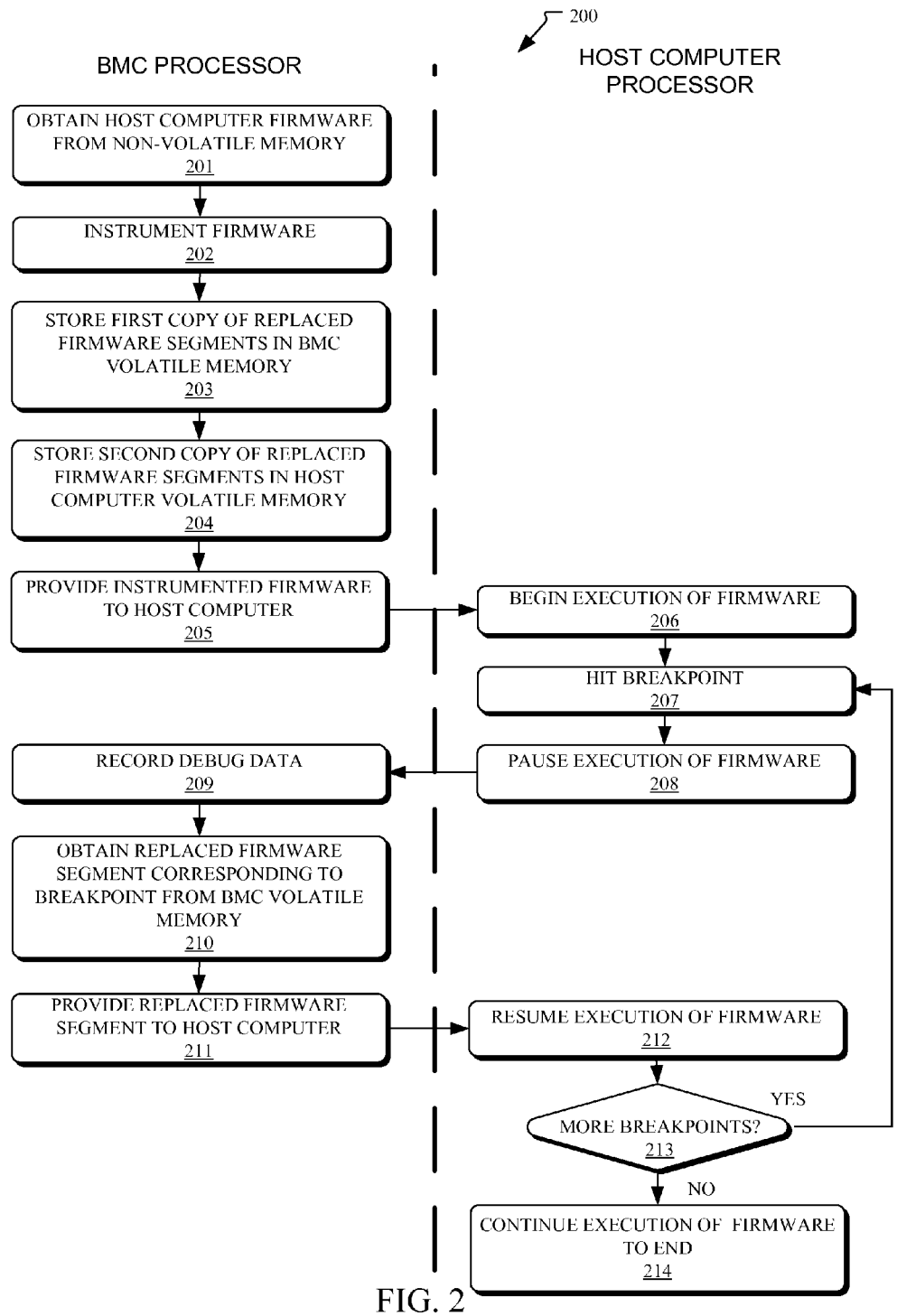
FIG. 2 illustrates a flowchart of an example method for performing a debugging session on the firmware of a host computer, in accordance with embodiments of the present disclosure.

Referring now to FIG. 2, shown is a flowchart of an example method 200 for performing a debugging session on the firmware of a host computer, in accordance with embodiments of the present disclosure. In some embodiments, portions of the method 200 may be performed by one or more host computer processors (e.g., host computer processors 130 of FIG. 1), while other portions of the method 200 may be performed by one or more BMC processors (e.g., BMC processor 160 of FIG. 1) embedded within the host computer. Furthermore, in some embodiments, the operations of the method 200 may be instigated by a remote user attempting to diagnose bugs in the firmware of the host computer. This remote user may connect with the BMC as a client and then use a graphics tool to control the debugging session.

The method 200 may begin at operation 201, wherein a BMC (more specifically one or more processors of the BMC) may obtain host computer firmware from non-volatile memory. In some embodiments, the non-volatile memory may be host computer memory, BMC memory, or both. Further, in some embodiments, the host computer firmware may include the boot loader for the host computer's operating system. Per operation 202, the BMC may instrument the firmware. This may involve, for example, inserting breakpoints into the firmware in place of particular firmware segments based on the instructions received from a remote system administrator working via a graphical user interface. More specifically, instrumenting the firmware may involve repeatedly replacing, within the copy of the firmware stored in the host computer volatile memory, a segment of the firmware with a corresponding breakpoint instruction. In some embodiments, instrumenting the firmware may include inserting code segments other than or in addition to breakpoints (e.g., code configured to cause variable tracing, log file writing, etc.).

Per operation 203, the BMC may store a first copy of the replaced firmware segments into the BMC's volatile memory. More specifically, in some embodiments, the replaced firmware segments may be stored along with other vital debug information (e.g., segment location information, information used to detect which host processor hits a given breakpoint, information about the core/thread where a given breakpoint is triggered) in one or more data structures at designated addresses within the BMC's volatile memory. In some embodiments, the data structure may be stored in a shared memory portion of the BMC's volatile memory. By using a shared memory approach, multiple clients may be able to use tools (e.g., command line tools, graphical tools) to independently set and clear breakpoints in the host computer firmware.

Per operation 204, the BMC may store an additional copy of the replaced firmware segments (and potentially the other vital debug information) in the host computer's volatile memory. In some embodiments, this may involve mirroring the BMC's shared memory into the host computer's volatile memory and keeping both memories updated (e.g. by changing them both each time a new breakpoint is hit or set). In some embodiments, the vital debug information stored the BMC's volatile memory and the host computer's volatile memory may be substantially identical to each other. In some embodiments, the portion of the host computer's volatile memory used by the BMC may specifically set aside for the BMC's use by a hypervisor.

In some embodiments, the copying of vital debug information into the host computer's volatile memory may occur when a reboot of the BMC is imminent. This may be aided by tools built into the BMC that are configured to detect when a reboot (or crash) of the BMC is about to occur. Such tools (e.g., dump collection software) may, within a short window before a reboot, detect the upcoming reboot, collect the latest copy of the vital debug information stored in the BMC non-volatile memory, and cause the creation of a backup copy of that information in the host non-volatile memory. Using such tools may have the advantage of allowing the system to only create a backup copy of vital debug information just before a reboot of the BMC, rather than having to create (and periodically update) a backup copy all the time.

Per operation 205, the BMC may provide the instrumented firmware to the host computer's non-volatile memory. Upon receiving the instrumented firmware, and per operation 206, the host computer (more specifically one or more processors of the host computer) may begin execution of the instrumented firmware. Per operation 207, the host computer may hit a breakpoint during the firmware execution. This may cause a software breakpoint interrupt to be triggered, and, per operation 208, the host computer may pause execution of the firmware. In some embodiments, the system administrator may manually step through the breakpoints.

The BMC may be notified that the breakpoint has been hit. Based the identification of the breakpoint, the BMC may be able to determine which host processor 130 actually hit the breakpoint. Per operation 209 and during the pause in execution of the firmware, the BMC may record debug data about the status of the host computer at the pause. This debug data, which may be useful in the diagnosis of bugs in the host computer firmware, may include information about the status of components of the host computer (e.g., register contents, processor states). This debug data may be recorded, for example, in the BMC's volatile memory. In some embodiments, the first and second copies of the of the vital debug information may also be updated at this time.

Per operation 210, the BMC may then obtain from the BMC volatile memory the replaced firmware segment that corresponds to the breakpoint hit in operation 207. Per operation 211, the BMC may provide this replaced firmware segment to the host computer. And, per operation 212, the host computer may use this firmware segment to resume execution of the firmware.

Per decision block 213, for each additional breakpoint in the instrumented firmware, the operations 207-212 may be repeated as necessary. Once there are no remaining breaking points to be hit and per operation 214, the host computer may continue end execution of the firmware to an end (e.g., by continuing execution until the boot of the host computer is complete). In some embodiments, the debugging session may be completed after operation 214 and the collected debug data may be used to aid the system administrator in making improvements to the code segments of the firmware.

While an example embodiment of method 200 is described herein, it is contemplated many additional variants on the method 200 may be possible. For example, in some embodiments, instrumenting the host computer firmware may involve inserting tracing instructions in the firmware without removing code segments from the firmware. In such embodiments, the vital debug information (stored in both the BMC volatile memory and the host volatile memory) may include information other than replaced firmware code segments.

Figure 3:
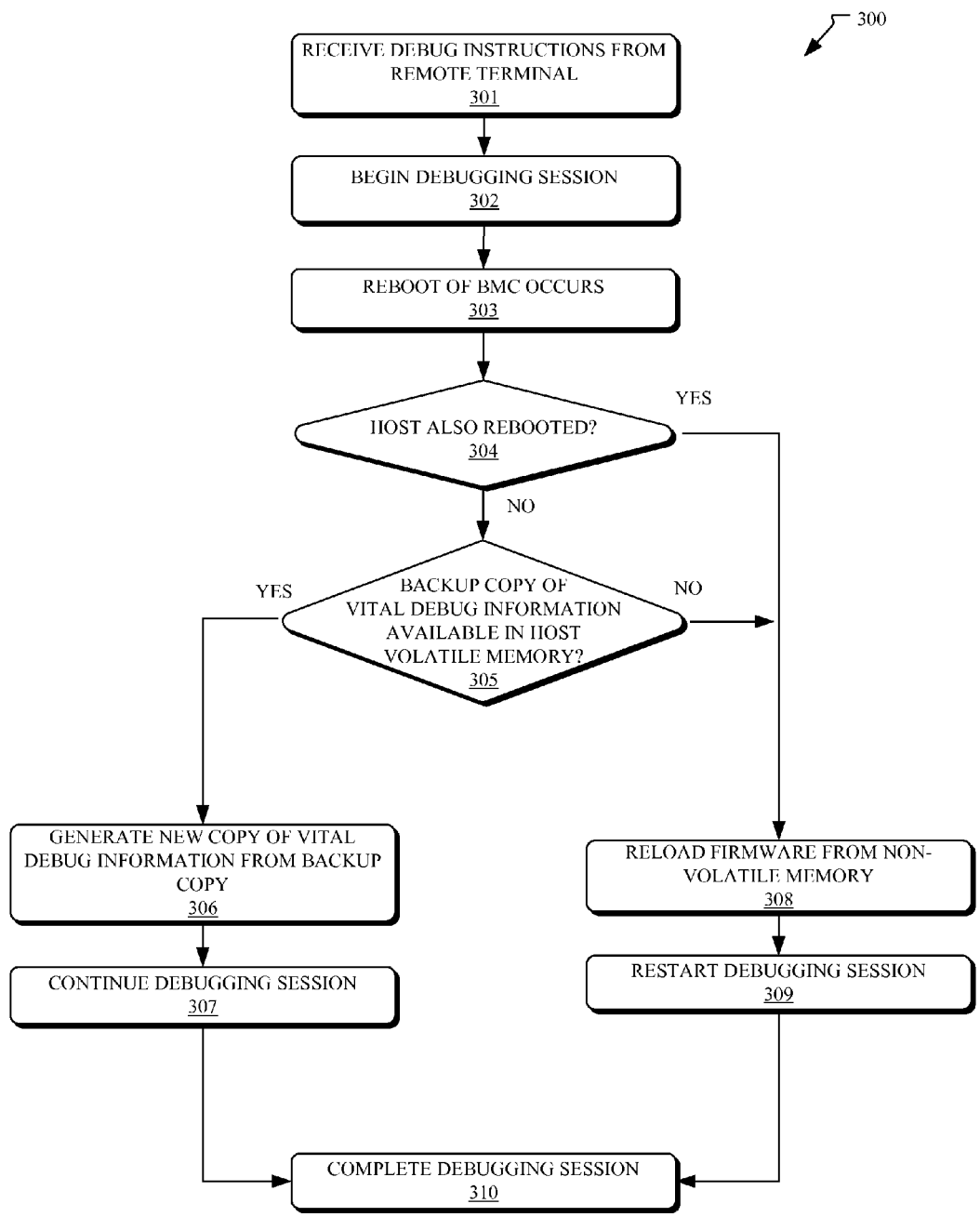
FIG. 3 illustrates a flowchart of an example method for using a backup copy of vital debug information to complete an interrupted debug session, in accordance with embodiments of the present disclosure.

Referring now to FIG. 3, shown is a flowchart of an example method 300 for using a backup copy of vital debug information to complete an interrupted debug session, in accordance with embodiments of the present disclosure. In some embodiments, operations of the method 300 may be performed by one or more processor of a BMC (e.g., BMC processor 160 of FIG. 1).

The method 300 may begin at operation 301, wherein the BMC (more specifically the BMC's processor) may receive instructions from a remote terminal. Per operation 302 and in response to the instructions, the BMC may begin performing a debugging session. In some embodiments, the debugging session may include one or more operations of the method 200 of FIG. 2. Per operation 303, a reboot of the BMC occurs during the debugging session. In some embodiments, this reboot may result in the loss of a first copy of vital debug information stored in the BMC's volatile memory (e.g., a first copy of replaced firmware segments stored there in operation 203 of FIG. 2).

Per operation 304, a determination may be made as to whether the host computer was also rebooted at the time that the BMC rebooted. If so, then any backup of vital debug information that may have been stored in the host computer's volatile memory (e.g., in operation 204 of FIG. 2) is likely to have also been lost in the reboot. In such a situation, the BMC may need, per operation 308, to reload the firmware from the non-volatile memory and restart the debugging session, per operation 309. Per operation 310, the restarted debugging session may then be completed.

If, however, a determination is made in operation 304 that the host computer was not also rebooted at the time the BMC was rebooted, then the method may proceed to operation 305. Per operation 305, a second determination is made as to whether there is a backup copy of the vital debug information available in the host computer volatile memory. If there is no such backup copy (e.g., where a backup copy was never created by the BMC in the first instance), then the BMC may need, per operation 308, to reload the firmware from the non-volatile memory and restart the debugging session, per operation 309. Per operation 310, the restarted debugging session may then be completed.

If, however, a second determination is made in operation 305 that there is a backup copy of vital debug information available in the host volatile memory, then, per operation 306, the BMC may generate a new copy of the vital debug information from the backup copy. And, using the new copy and per operation 307, the BMC may be able to continue the debugging session from where it was interrupted (rather than restarting it). Per operation 310, the continued debugging session may then be completed.

Figure 4:
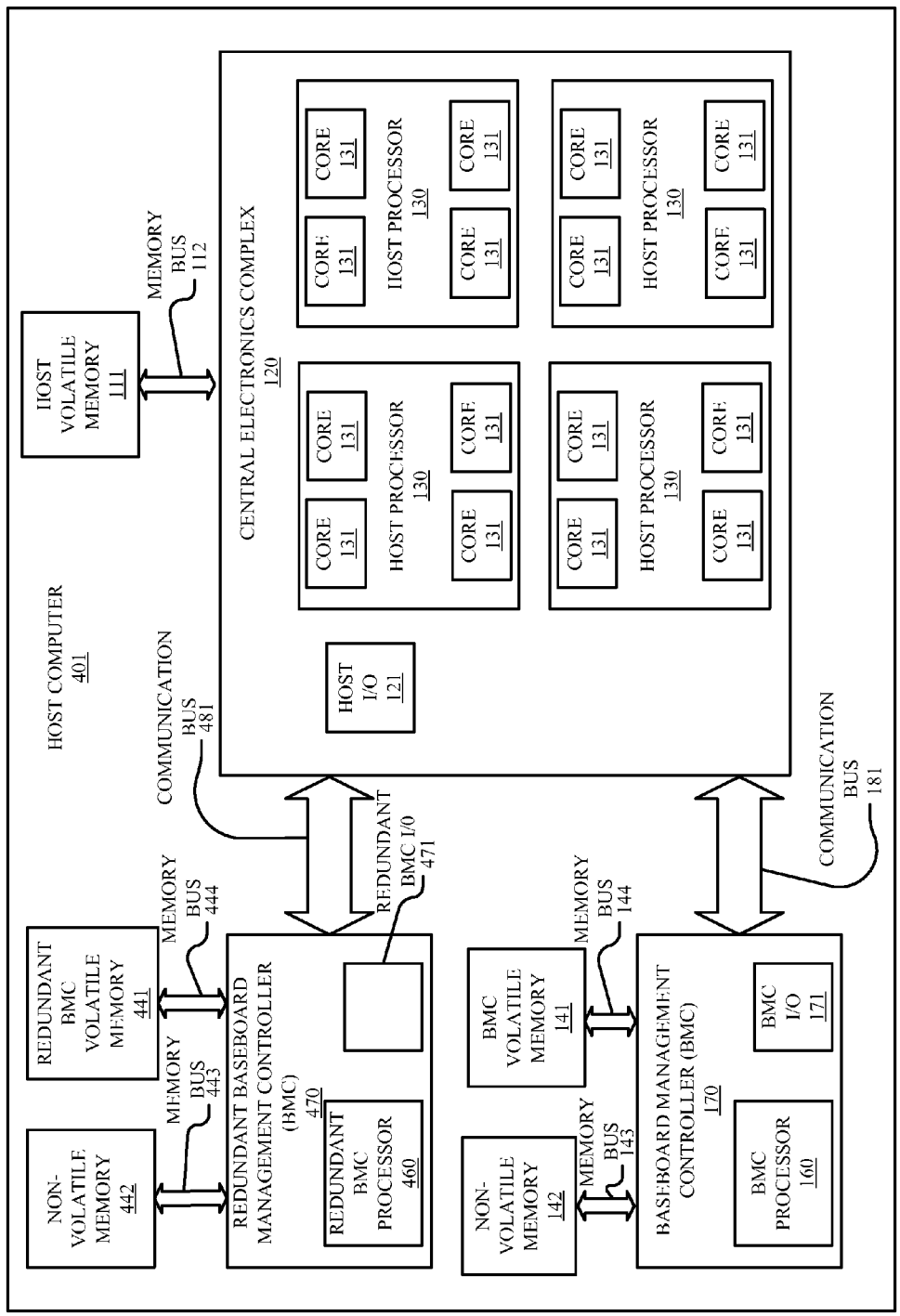
FIG. 4 illustrates a block diagram of a second example host computer including a redundant baseboard management controller (BMC), in accordance with embodiments of the present disclosure.

Referring now to FIG. 4, a block diagram of a second example host computer 401 including a redundant BMC 470 is shown, in accordance with embodiments of the present disclosure. As depicted, the host computer 401 may include several components in addition to those included in host computer 101 of FIG. 1. Among the additional components is a redundant BMC 470. In some embodiments, the redundant BMC 470 may be a backup to the BMC 170 and may remain mostly unused unless and until there is a failover from the BMC 170. As shown, redundant BMC 470 may include a redundant BMC processor 460 and a redundant BMC I/O 471. For communication purposes, the redundant BMC 470 may be connected to the central electronics complex 120 via a communication bus 481 and also connected to non-volatile memory 442 and Redundant BMC volatile memory 441 via memory buses 443 and 444, respectively. The non-volatile memory 442 may be used to store a copy of the host computer firmware that may the same or different from the copy stored in the non-volatile memory 142.

In some embodiments, redundant BMC 470 may add a level of reliability to the system by being configured to take over and continue normal operations in the event of a failure of the BMC 170. Some embodiments may further include a redundancy manager subsystem (not shown) that is responsible for keeping track of the statuses of the BMC 170 and redundant BMC 470. This redundancy manager may also coordinate a failover from the BMC 170 by synchronizing data between BMC 170 and redundant BMC 470 and by switching the role of redundant BMC 470 from backup to primary.

In some embodiments where a backup copy of vital debug information is stored in the host volatile memory 111, the inconvenience caused by a failover from BMC 170 to redundant BMC 470 during a debugging session may be minimized. In such a situation, the redundant BMC 470 may be able to determine where in the host volatile memory 111 the backup copy is located (e.g., by communicating with the host computer's hypervisor) and may be able to use the backup copy to continue the debugging session from where the BMC 170 left off, for example, by copying the back copy of the vital debug information from the host volatile memory 111 into the redundant BMC volatile memory 441.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for using a host computer housing an embedded baseboard management controller (BMC), the BMC including non-volatile memory having host computer firmware stored thereon, further including BMC volatile memory, and further including a BMC processor communicatively coupled to the BMC volatile memory and the non-volatile memory, and the host computer including a host computer volatile memory and further including a host computer processor communicatively coupled to the host computer volatile memory, the method comprising:
    obtaining the host computer firmware from the non-volatile memory;
    instrumenting the obtained host computer firmware;
    storing the instrumented host computer firmware on the host computer volatile memory;
    storing, on the BMC volatile memory, a first copy of vital debug information associated with the instrumented host computer firmware;
    storing a second copy of the vital debug information on the host computer volatile memory;
    obtaining the instrumented host computer firmware from the host computer volatile memory; and
    executing the instrumented host computer firmware.

2. The method of claim 1, wherein the first copy of the vital debug information comprises a first copy of firmware code segments replaced in the obtained host computer firmware by breakpoints during the instrumenting, and wherein the second copy of the vital debug information comprises a second copy of the replaced firmware code segments.

3. The method of claim 2, wherein the instrumenting the obtained host computer firmware occurs as part of a host computer debug session performed by the BMC, and wherein the method further comprises:
    determining, before a completion of the debug session, that the first copy of the replaced firmware code segments is corrupted; and
    generating a third copy of the replaced firmware code segments by copying, in response to the corruption determination, the second copy of the replaced firmware code segments from the host computer volatile memory to the BMC volatile memory.

4. The method of claim 1, wherein the BMC further comprises a BMC device interface configured to receive instructions from a remote terminal, and wherein the instrumenting the obtained host computer firmware is in response to the receipt of the instructions.

5. The method of claim 1, wherein the method further comprises:
    detecting, subsequent to the storing the first copy of the vital debug information on the BMC volatile memory, an imminent reboot of the BMC,
    wherein the storing the second copy of the vital debug information on the host computer volatile memory is in response to the detecting the imminent reboot.

6. A method for using a host computer and an embedded baseboard management controller (BMC) housed within the host computer, wherein the host computer includes non-volatile memory having host computer firmware stored thereon, further includes a host computer volatile memory, and further includes a host computer processor communicatively coupled to the host computer volatile memory, and wherein the BMC includes a BMC volatile memory and further includes a BMC processor communicatively coupled to the BMC volatile memory and the non-volatile memory, the method comprising:
    obtaining, by the BMC processor, the host computer firmware from the non-volatile memory;
    instrumenting, by the BMC processor, the obtained host computer firmware;
    storing, by the BMC processor, the instrumented host computer firmware on a host computer volatile memory;
    storing, by the BMC processor and on the BMC volatile memory, a first copy of vital debug information associated with the instrumented host computer firmware;
    storing, by the BMC processor, a second copy of the vital debug information on the host computer volatile memory;
    obtaining, by the host computer processor, the instrumented host computer firmware from the host computer volatile memory; and
    executing, by the host computer processor, the instrumented host computer firmware.

7. The method of claim 6, wherein the first copy of the vital debug information comprises a first copy of firmware code segments replaced in the obtained host computer firmware by breakpoints during the instrumenting, and wherein the second copy of the vital debug information comprises a second copy of the replaced firmware code segments.

8. The method of claim 7, wherein the instrumenting the obtained host computer firmware occurs as part of a host computer debug session performed by the BMC, the method further comprising:
    determining, by the BMC processor and before a completion of the debug session, that the first copy of the replaced firmware code segments is corrupted; and
    generating, by the BMC processor, a third copy of the replaced firmware code segments by copying, in response to the corruption determination, the second copy of the replaced firmware code segments from the host computer volatile memory to the BMC volatile memory.

9. The method of claim 8 further comprising:
using, by the BMC processor, the third copy of the of the replaced firmware code segments to complete the debug session.

10. The method of claim 6, wherein the BMC further includes a BMC device interface configured to receive instructions from a remote terminal, and wherein the instrumenting the obtained host computer firmware is in response to the receipt of the instructions.

11. The method of claim 7, further comprising:
pausing, by the host computer processor, the execution of the instrumented host computer firmware when a first breakpoint is hit;
resuming, by the host computer processor, the execution of the instrumented host computer firmware after the pause when a first replaced code segment corresponding to the first breakpoint is provided by the BMC, and
copying, by the BMC processor and during the pause, contents from registers of the host computer processor;
obtaining, by the BMC processor and during the pause, the first replaced code segment from the first copy of firmware code segments stored on the BMC volatile memory; and
providing, by the BMC processor, the first replaced code segment to the host computer.

12. The method of claim 7, wherein the first copy of the replaced firmware code segments is stored in a shared memory portion of the BMC volatile memory, wherein the host computer further houses an embedded redundant BMC, and wherein the redundant BMC includes a redundant BMC processor communicatively coupled to the shared memory, the method further comprising:

responding, by the redundant BMC processor, to a failover from the BMC to the redundant BMC and an associated deletion of the shared memory by:
causing a new shared memory to be created; and
generating a third copy of the replaced firmware code segments by copying, in response to the deletion of the shared memory, the second copy of the replaced firmware code segments from the host computer volatile memory to the new shared memory.

13. The method of claim 7, wherein a reboot of the BMC causes the first copy of firmware code segments to be deleted from the BMC volatile memory, the method further comprising:
generating, by the BMC processor and subsequent to the reboot, a third copy of the replaced firmware code segments by copying the second copy of the replaced firmware code segments from the host computer volatile memory to the BMC volatile memory.

14. The method of claim 7 further comprising:
causing, by the BMC processor, the second copy of the replaced firmware segments stored on the host computer volatile memory to be updated contemporaneously with corresponding updates being made to the first copy of the replaced firmware code segments stored on the BMC volatile memory.

15. The method of claim 6 further comprising:
detecting, by the BMC processor and subsequent to the storing the first copy of the vital debug information on the BMC volatile memory, an imminent reboot of the BMC,
wherein the storing the second copy of the vital debug information on the host computer volatile memory is in response to the detecting the imminent reboot.

* * * * *